(12) United States Patent
Pedlow, Jr. et al.

(10) Patent No.: US 7,218,738 B2
(45) Date of Patent: May 15, 2007

(54) ENCRYPTION AND CONTENT CONTROL IN A DIGITAL BROADCAST SYSTEM

(75) Inventors: Leo M. Pedlow, Jr., Ramona, CA (US); Brant L. Candelore, Escondido, CA (US); Henry Derovanessian, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 772 days.

(21) Appl. No.: 10/273,875

(22) Filed: Oct. 18, 2002

(65) Prior Publication Data
US 2003/0123664 A1    Jul. 3, 2003

Related U.S. Application Data

(63) Continuation-in-part of application No. 10/038,217, filed on Jan. 2, 2002, and a continuation-in-part of application No. 10/038,032, filed on Jan. 2, 2002, now Pat. No. 7,139,398, and a continuation-in-part of application No. 10/037,914, filed on Jan. 2, 2002, now Pat. No. 7,124,303, and a continuation-in-part of application No. 10/037,499, filed on Jan. 2, 2002, and a continuation-in-part of application No. 10/037,498, filed on Jan. 2, 2002, now Pat. No. 7,127,619.

(60) Provisional application No. 60/370,274, filed on Apr. 5, 2002, provisional application No. 60/355,326, filed on Feb. 8, 2002.

(51) Int. Cl.
*H04N 7/167* (2006.01)
(52) U.S. Cl. .................................... 380/218; 380/35
(58) Field of Classification Search ................. 380/218
See application file for complete search history.

(56) References Cited

U.S. PATENT DOCUMENTS 3,852,519 A    12/1974    Court (Continued)

FOREIGN PATENT DOCUMENTS

EP    0471373    2/1992

(Continued)

OTHER PUBLICATIONS

"Performance Study of a Selective Encryption Scheme for the Security of Networked, Real-Time Video" by Spanos and Maples, pp. 2-10, 1995, IEEE.

(Continued)

*Primary Examiner*—Gilberto Barron, Jr.
*Assistant Examiner*—David Garcia Cervetti
(74) *Attorney, Agent, or Firm*—Miller Patent Services; Jerry A. Miller

(57) ABSTRACT

A selective encryption encoder has a packet identifier that identifies packets of a specified packet type forming a part of a program. A packet duplicator duplicates the identified packets to produce first and second sets of the identified packets. A PMT (program map table) inserter generates temporary identifying information that identifies the first and second sets of identified packets inserts the temporary identifying information as user private data in a program map table (PMT) forming a part of the transport program specific information (PSI). The data are then sent to and received from a primary encryption encoder to encrypt the first set of identified packets under a first encryption method. A secondary encrypter encrypts the second set of identified packets under a second encryption method. The PSI is then modified at a PSI modifier to remove the temporary identifying information and to correctly associate the first and second sets of identified packets and the unencrypted packets with the program.

27 Claims, 5 Drawing Sheets

U.S. PATENT DOCUMENTS

| | | | |
|---|---|---|---|
| 4,381,519 A | 4/1983 | Wilkinson et al. | |
| 4,419,693 A * | 12/1983 | Wilkinson | 348/616 |
| 4,521,853 A * | 6/1985 | Guttag | 711/163 |
| 4,634,808 A * | 1/1987 | Moerder | 380/29 |
| 4,700,387 A * | 10/1987 | Hirata | 380/239 |
| 4,703,351 A * | 10/1987 | Kondo | 375/240.12 |
| 4,703,352 A * | 10/1987 | Kondo | 375/240.24 |
| 4,710,811 A * | 12/1987 | Kondo | 375/240.24 |
| 4,712,238 A | 12/1987 | Gilhousen et al. | |
| 4,722,003 A | 1/1988 | Kondo | |
| 4,739,510 A | 4/1988 | Jeffers et al. | |
| 4,772,947 A | 9/1988 | Kondo | |
| 4,785,361 A | 11/1988 | Brotby | |
| 4,788,589 A | 11/1988 | Kondo | |
| 4,815,078 A | 3/1989 | Shimura | |
| 4,845,560 A | 7/1989 | Kondo et al. | |
| 4,887,296 A | 12/1989 | Horne | |
| 4,890,161 A | 12/1989 | Kondo | |
| 4,914,515 A | 4/1990 | Van Luyt | |
| 4,924,310 A | 5/1990 | von Brandt | |
| 4,944,006 A | 7/1990 | Citta et al. | |
| 4,953,023 A | 8/1990 | Kondo | |
| 4,989,245 A | 1/1991 | Bennett | |
| 4,995,080 A | 2/1991 | Bestler et al. | |
| 5,018,197 A | 5/1991 | Jones et al. | |
| 5,023,710 A | 6/1991 | Kondo et al. | |
| 5,091,936 A | 2/1992 | Katznelson | |
| 5,122,873 A | 6/1992 | Golin | |
| 5,138,659 A | 8/1992 | Kelkar et al. | |
| 5,142,537 A | 8/1992 | Kutner et al. | |
| 5,144,662 A | 9/1992 | Welmer | |
| 5,144,664 A | 9/1992 | Esserman et al. | |
| 5,159,452 A | 10/1992 | Kinoshita et al. | |
| 5,196,931 A | 3/1993 | Kondo | |
| 5,208,816 A | 5/1993 | Seshardi et al. | |
| 5,237,424 A | 8/1993 | Nishino et al. | |
| 5,237,610 A | 8/1993 | Gammie et al. | |
| 5,241,381 A | 8/1993 | Kondo | |
| 5,247,575 A * | 9/1993 | Sprague et al. | 705/53 |
| 5,258,835 A * | 11/1993 | Kato | 375/240.12 |
| 5,319,707 A | 6/1994 | Wasilewski et al. | |
| 5,319,712 A * | 6/1994 | Finkelstein et al. | 380/44 |
| 5,325,432 A * | 6/1994 | Gardeck et al. | 380/273 |
| 5,327,502 A | 7/1994 | Katata | |
| 5,341,425 A | 8/1994 | Wasilewski et al. | |
| 5,359,694 A | 10/1994 | Concordel | |
| 5,379,072 A | 1/1995 | Kondo | |
| 5,381,481 A | 1/1995 | Gammie et al. | |
| 5,398,078 A | 3/1995 | Masuda et al. | |
| 5,400,401 A | 3/1995 | Wasilewski et al. | |
| 5,416,651 A | 5/1995 | Uetake et al. | |
| 5,416,847 A | 5/1995 | Boze | |
| 5,420,866 A | 5/1995 | Wasilewski | |
| 5,428,403 A | 6/1995 | Andrew et al. | |
| 5,434,716 A * | 7/1995 | Sugiyama et al. | 360/32 |
| 5,438,369 A * | 8/1995 | Citta et al. | 348/470 |
| 5,444,491 A | 8/1995 | Lim | |
| 5,444,782 A | 8/1995 | Adams, Jr. et al. | |
| 5,455,862 A * | 10/1995 | Hoskinson | 380/262 |
| 5,469,216 A * | 11/1995 | Takahashi et al. | 348/441 |
| 5,471,501 A | 11/1995 | Parr et al. | |
| 5,473,692 A | 12/1995 | Davis | |
| 5,481,554 A | 1/1996 | Kondo | |
| 5,481,627 A | 1/1996 | Kim | |
| 5,485,577 A | 1/1996 | Eyer et al. | |
| 5,491,748 A | 2/1996 | Auld, Jr. et al. | |
| 5,528,608 A | 6/1996 | Shimizume | |
| 5,535,276 A | 7/1996 | Ganesan | |
| 5,539,823 A | 7/1996 | Martin | |
| 5,539,828 A | 7/1996 | Davis | |
| 5,553,141 A * | 9/1996 | Lowry et al. | 380/216 |
| 5,555,305 A | 9/1996 | Robinson et al. | |
| 5,561,713 A | 10/1996 | Suh | |
| 5,568,552 A | 10/1996 | Davis | |
| 5,574,787 A | 11/1996 | Ryan | |
| 5,582,470 A | 12/1996 | Yu | |
| 5,583,576 A | 12/1996 | Perlman et al. | |
| 5,583,863 A | 12/1996 | Darr, Jr. et al. | |
| 5,590,202 A | 12/1996 | Bestler et al. | |
| 5,598,214 A | 1/1997 | Kondo et al. | |
| 5,600,721 A | 2/1997 | Kitazato | |
| 5,606,359 A | 2/1997 | Youden et al. | |
| 5,608,448 A | 3/1997 | Smoral et al. | |
| 5,615,265 A | 3/1997 | Coutrot | |
| 5,617,333 A | 4/1997 | Oyamada et al. | |
| 5,625,715 A | 4/1997 | Trew et al. | |
| 5,629,981 A * | 5/1997 | Nerlikar | 713/168 |
| 5,652,795 A * | 7/1997 | Dillon et al. | 713/163 |
| 5,663,764 A * | 9/1997 | Kondo et al. | 375/240.14 |
| 5,666,293 A | 9/1997 | Metz et al. | |
| 5,699,429 A | 12/1997 | Tamer et al. | |
| 5,703,889 A | 12/1997 | Shimoda et al. | |
| 5,717,814 A | 2/1998 | Abecassis | |
| 5,726,711 A | 3/1998 | Boyce | |
| 5,732,346 A | 3/1998 | Lazaridis et al. | |
| 5,742,680 A | 4/1998 | Wilson | |
| 5,742,681 A | 4/1998 | Giachetti et al. | |
| 5,751,280 A | 5/1998 | Abbott et al. | |
| 5,751,743 A | 5/1998 | Takizawa | |
| 5,751,813 A | 5/1998 | Dorenbos | |
| 5,754,650 A | 5/1998 | Katznelson | |
| 5,754,658 A | 5/1998 | Aucsmith | |
| 5,757,417 A | 5/1998 | Aras et al. | |
| 5,757,909 A | 5/1998 | Park | |
| 5,768,539 A | 6/1998 | Metz et al. | |
| 5,796,786 A | 8/1998 | Lee | |
| 5,796,829 A | 8/1998 | Newby et al. | |
| 5,796,840 A | 8/1998 | Davis | |
| 5,802,176 A | 9/1998 | Audebert | |
| 5,805,700 A | 9/1998 | Nardone et al. | |
| 5,805,712 A | 9/1998 | Davis | |
| 5,805,762 A | 9/1998 | Boyce et al. | |
| 5,809,417 A | 9/1998 | De Lange et al. | |
| 5,815,146 A | 9/1998 | Youden et al. | |
| 5,818,934 A | 10/1998 | Cuccia | |
| 5,825,879 A | 10/1998 | Davis | |
| 5,850,218 A | 12/1998 | LaJoie et al. | |
| 5,852,290 A | 12/1998 | Chaney | |
| 5,852,470 A | 12/1998 | Kondo et al. | |
| 5,870,474 A | 2/1999 | Wasiliewski et al. | |
| 5,894,320 A | 4/1999 | Vancelette | |
| 5,894,516 A | 4/1999 | Brandenburg | |
| 5,915,018 A | 6/1999 | Aucsmith | |
| 5,922,048 A | 7/1999 | Emura | |
| 5,923,755 A | 7/1999 | Birch et al. | |
| 5,930,361 A | 7/1999 | Hayashi et al. | |
| 5,933,500 A | 8/1999 | Blatter et al. | |
| 5,940,738 A | 8/1999 | Rao | |
| 5,949,877 A | 9/1999 | Traw et al. | |
| 5,949,881 A | 9/1999 | Davis | |
| 5,973,679 A | 10/1999 | Abbott et al. | |
| 5,973,722 A | 10/1999 | Wakai et al. | |
| 5,999,622 A | 12/1999 | Yasukawa et al. | |
| 5,999,698 A | 12/1999 | Nakai et al. | |
| 6,005,561 A | 12/1999 | Hawkins et al. | |
| 6,011,849 A | 1/2000 | Orrin | |
| 6,012,144 A | 1/2000 | Pickett | |
| 6,016,348 A * | 1/2000 | Blatter et al. | 380/228 |
| 6,021,199 A | 2/2000 | Ishibashi | |
| 6,021,201 A | 2/2000 | Bakhle et al. | |
| 6,026,164 A | 2/2000 | Sakamoto et al. | |
| 6,028,932 A | 2/2000 | Park | |
| 6,049,613 A | 4/2000 | Jakobsson | |
| 6,055,314 A | 4/2000 | Spies et al. | |

| | | | | | | |
|---|---|---|---|---|---|---|
| 6,055,315 | A | 4/2000 | Doyle et al. | 6,640,145 | B2 | 10/2003 | Hoffberg et al. |
| 6,057,872 | A | 5/2000 | Candelore | 6,650,754 | B2 | 11/2003 | Akiyama et al. |
| 6,058,186 | A | 5/2000 | Enari | 6,654,389 | B1 | 11/2003 | Brunheroto et al. |
| 6,058,192 | A | 5/2000 | Guralnick et al. | 6,678,740 | B1 | 1/2004 | Rakib et al. |
| 6,061,451 | A | 5/2000 | Muratani et al. | 6,681,326 | B2 | 1/2004 | Son et al. |
| 6,064,748 | A | 5/2000 | Hogan | 6,684,250 | B2 | 1/2004 | Anderson et al. |
| 6,065,050 | A | 5/2000 | DeMoney | 6,697,944 | B1 | 2/2004 | Jones et al. |
| 6,069,647 | A | 5/2000 | Sullivan et al. | 6,714,650 | B1 | 3/2004 | Maillard et al. |
| 6,070,245 | A | 5/2000 | Murphy, Jr. et al. | 6,754,276 | B1 | 6/2004 | Harumoto et al. |
| 6,072,872 | A | 6/2000 | Chang et al. | 6,772,340 | B1 | 8/2004 | Peinado et al. |
| 6,072,873 | A | 6/2000 | Bewick | 6,788,690 | B2 | 9/2004 | Harri |
| 6,073,122 | A | 6/2000 | Wool | 6,826,185 | B1 | 11/2004 | Montanaro et al. |
| 6,088,450 | A | 7/2000 | Davis et al. | 6,891,565 | B1 | 5/2005 | Dieterich |
| 6,105,134 | A | 8/2000 | Pinder et al. | 6,895,128 | B2 | 5/2005 | Bohnenkamp |
| 6,108,422 | A | 8/2000 | Newby et al. | 6,904,520 | B1 | 6/2005 | Rosset et al. |
| 6,115,821 | A | 9/2000 | Newby et al. | 6,917,684 | B1 | 7/2005 | Tatebayashi et al. |
| 6,118,873 | A | 9/2000 | Lotspiech et al. | 6,938,162 | B1 | 8/2005 | Nagai et al. |
| 6,134,551 | A | 10/2000 | Aucsmith | 6,976,166 | B2 * | 12/2005 | Herley et al. ............... 713/165 |
| 6,138,237 | A | 10/2000 | Ruben et al. | 7,039,938 | B2 | 5/2006 | Candelore |
| 6,148,082 | A | 11/2000 | Slattery et al. | 7,065,213 | B2 | 6/2006 | Pinder |
| 6,154,206 | A | 11/2000 | Ludtke | 7,127,619 | B2 | 10/2006 | Unger et al. |
| 6,157,719 | A | 12/2000 | Wasilewski et al. | 2001/0030959 | A1 * | 10/2001 | Ozawa et al. ............... 370/386 |
| 6,181,334 | B1 | 1/2001 | Freeman et al. | 2001/0036271 | A1 | 11/2001 | Javed |
| 6,185,369 | B1 | 2/2001 | Ko et al. | 2001/0051007 | A1 | 12/2001 | Teshima |
| 6,185,546 | B1 | 2/2001 | Davis | 2002/0003881 | A1 | 1/2002 | Reitmeier et al. |
| 6,189,096 | B1 | 2/2001 | Haverty | 2002/0026587 | A1 | 2/2002 | Talstra et al. |
| 6,192,131 | B1 | 2/2001 | Geer et al. | 2002/0046406 | A1 * | 4/2002 | Chelehmal et al. ........... 725/87 |
| 6,199,053 | B1 | 3/2001 | Herbert et al. | 2002/0047915 | A1 | 4/2002 | Misu |
| 6,204,843 | B1 | 3/2001 | Freeman et al. | 2002/0059425 | A1 * | 5/2002 | Belfiore et al. ............. 709/226 |
| 6,209,098 | B1 | 3/2001 | Davis | 2002/0083317 | A1 * | 6/2002 | Ohta et al. .................. 713/161 |
| 6,215,484 | B1 | 4/2001 | Freeman et al. | 2002/0083438 | A1 * | 6/2002 | So et al. ..................... 725/31 |
| 6,226,618 | B1 | 5/2001 | Downs | 2002/0097322 | A1 | 7/2002 | Monroe et al. |
| 6,229,895 | B1 | 5/2001 | Son et al. | 2002/0108035 | A1 * | 8/2002 | Herley et al. ............... 713/165 |
| 6,230,194 | B1 | 5/2001 | Frailong et al. | 2002/0116705 | A1 | 8/2002 | Perlman et al. |
| 6,230,266 | B1 | 5/2001 | Perlman et al. | 2002/0126890 | A1 | 9/2002 | Katayama et al. |
| 6,236,727 | B1 | 5/2001 | Ciacelli et al. | 2002/0129243 | A1 | 9/2002 | Nanjundiah |
| 6,240,553 | B1 | 5/2001 | Son et al. | 2002/0150239 | A1 * | 10/2002 | Carny et al. .................. 380/37 |
| 6,246,720 | B1 | 6/2001 | Kutner et al. | 2002/0164022 | A1 | 11/2002 | Strasser et al. |
| 6,256,747 | B1 | 7/2001 | Inohara et al. | 2002/0170053 | A1 | 11/2002 | Peterka et al. |
| 6,263,506 | B1 | 7/2001 | Ezaki et al. | 2002/0184506 | A1 | 12/2002 | Perlman |
| 6,266,416 | B1 | 7/2001 | Sigbjornsen et al. | 2002/0194613 | A1 | 12/2002 | Unger |
| 6,266,480 | B1 | 7/2001 | Ezaki et al. | 2002/0196939 | A1 | 12/2002 | Unger et al. |
| 6,272,538 | B1 | 8/2001 | Holden et al. | 2003/0002854 | A1 | 1/2003 | Belknap et al. |
| 6,278,783 | B1 | 8/2001 | Kocher et al. | 2003/0009669 | A1 | 1/2003 | White et al. |
| 6,289,455 | B1 | 9/2001 | Kocher et al. | 2003/0012286 | A1 | 1/2003 | Ishtiaq et al. |
| 6,292,568 | B1 | 9/2001 | Akins, III et al. | 2003/0021412 | A1 * | 1/2003 | Candelore et al. .......... 380/217 |
| 6,292,892 | B1 | 9/2001 | Davis | 2003/0026423 | A1 * | 2/2003 | Unger et al. ................ 380/217 |
| 6,307,939 | B1 | 10/2001 | Vigarie | 2003/0046686 | A1 * | 3/2003 | Candelore et al. ............ 725/31 |
| 6,311,012 | B1 | 10/2001 | Cho et al. | 2003/0059047 | A1 | 3/2003 | Iwamura |
| 6,324,288 | B1 | 11/2001 | Hoffman | 2003/0063615 | A1 * | 4/2003 | Luoma et al. ............... 370/401 |
| 6,351,538 | B1 | 2/2002 | Uz | 2003/0072555 | A1 | 4/2003 | Yap et al. |
| 6,378,130 | B1 | 4/2002 | Adams | 2003/0077071 | A1 * | 4/2003 | Lin et al. ...................... 386/68 |
| 6,389,533 | B1 | 5/2002 | Davis et al. | 2003/0081630 | A1 * | 5/2003 | Mowery et al. ............. 370/466 |
| 6,389,537 | B1 | 5/2002 | Davis et al. | 2003/0081776 | A1 * | 5/2003 | Candelore ................... 380/200 |
| 6,415,031 | B1 | 7/2002 | Colligan et al. | 2003/0084284 | A1 | 5/2003 | Ando et al. |
| 6,415,101 | B1 | 7/2002 | deCarmo et al. | 2003/0097662 | A1 | 5/2003 | Russ et al. |
| 6,430,361 | B2 | 8/2002 | Lee | 2003/0112333 | A1 | 6/2003 | Chen et al. |
| 6,445,738 | B1 | 9/2002 | Zdepski et al. | 2003/0118243 | A1 | 6/2003 | Sezer et al. ................. 382/245 |
| 6,449,718 | B1 | 9/2002 | Rucklidge et al. | 2003/0123664 | A1 * | 7/2003 | Pedlow et al. .............. 380/218 |
| 6,453,115 | B1 | 9/2002 | Boyle | 2003/0123849 | A1 * | 7/2003 | Nallur et al. .................. 386/68 |
| 6,456,985 | B1 | 9/2002 | Ohtsuka | 2003/0126086 | A1 * | 7/2003 | Safadi ......................... 705/51 |
| 6,459,427 | B1 | 10/2002 | Mao et al. | 2003/0133570 | A1 * | 7/2003 | Candelore et al. .......... 380/210 |
| 6,463,152 | B1 | 10/2002 | Takahashi | 2003/0140257 | A1 * | 7/2003 | Peterka et al. ............... 713/201 |
| 6,466,671 | B1 | 10/2002 | Maillard et al. | 2003/0145329 | A1 * | 7/2003 | Candelore .................... 725/87 |
| 6,505,032 | B1 | 1/2003 | McCorkle et al. | 2003/0152224 | A1 * | 8/2003 | Candelore et al. .......... 380/210 |
| 6,505,299 | B1 | 1/2003 | Zeng et al. | 2003/0152226 | A1 | 8/2003 | Candelore et al. |
| 6,510,554 | B1 | 1/2003 | Gordon et al. | 2003/0156718 | A1 | 8/2003 | Candelore et al. |
| 6,519,693 | B1 | 2/2003 | Debey | 2003/0159139 | A1 | 8/2003 | Candelore et al. |
| 6,529,526 | B1 | 3/2003 | Schneidewend | 2003/0159140 | A1 | 8/2003 | Candelore |
| 6,543,053 | B1 | 4/2003 | Li et al. | 2003/0159152 | A1 | 8/2003 | Lin et al. |
| 6,549,229 | B1 | 4/2003 | Kirby et al. | 2003/0174837 | A1 | 9/2003 | Candelore et al. |
| 6,557,031 | B1 | 4/2003 | Mimura et al. | 2003/0188154 | A1 | 10/2003 | Dallard |
| 6,587,561 | B1 | 7/2003 | Sered et al. | 2003/0193973 | A1 * | 10/2003 | Takashimizu et al. ....... 370/535 |

| | | | |
|---|---|---|---|
| 2003/0198223 | A1 | 10/2003 | Mark et al. |
| 2003/0204717 | A1 | 10/2003 | Kuehnel |
| 2003/0226149 | A1 | 12/2003 | Chun et al. |
| 2003/0228018 | A1 | 12/2003 | Vince |
| 2004/0003008 | A1 | 1/2004 | Wasilewshi et al. |
| 2004/0010717 | A1 | 1/2004 | Simec et al. |
| 2004/0021764 | A1 | 2/2004 | Driscott, Jr. et al. |
| 2004/0028227 | A1 | 2/2004 | Yu |
| 2004/0047470 | A1 | 3/2004 | Candelore |
| 2004/0049688 | A1 | 3/2004 | Candelore et al. |
| 2004/0049690 | A1* | 3/2004 | Candelore et al. .......... 713/193 |
| 2004/0049691 | A1* | 3/2004 | Candelore et al. .......... 713/193 |
| 2004/0049694 | A1* | 3/2004 | Candelore .................. 713/200 |
| 2004/0068659 | A1 | 4/2004 | Diehl |
| 2004/0078575 | A1* | 4/2004 | Morten et al. .............. 713/176 |
| 2004/0081333 | A1* | 4/2004 | Grab et al. ................. 382/100 |
| 2004/0091109 | A1* | 5/2004 | Son et al. ................... 380/200 |
| 2004/0100510 | A1 | 5/2004 | Milic-Frayling et al. |
| 2004/0123094 | A1* | 6/2004 | Sprunk ....................... 713/150 |
| 2004/0136532 | A1 | 7/2004 | Pinder et al. |
| 2004/0139337 | A1* | 7/2004 | Pinder et al. ............... 713/189 |
| 2004/0165586 | A1* | 8/2004 | Read et al. ................. 370/389 |
| 2004/0187161 | A1 | 9/2004 | Cao |
| 2004/0193550 | A1* | 9/2004 | Siegel ......................... 705/67 |
| 2004/0240668 | A1 | 12/2004 | Bonan et al. |
| 2004/0267602 | A1 | 12/2004 | Gaydos et al. |
| 2005/0004875 | A1* | 1/2005 | Konito et al. ................. 705/52 |
| 2005/0066357 | A1 | 3/2005 | Ryal |
| 2005/0071669 | A1* | 3/2005 | Medvinsky et al. ........ 713/200 |
| 2005/0169473 | A1* | 8/2005 | Candelore .................. 380/239 |
| 2005/0192904 | A1* | 9/2005 | Candelore .................... 705/51 |
| 2005/0259813 | A1 | 11/2005 | Wasilewski et al. |
| 2005/0265547 | A1 | 12/2005 | Stresser et al. |
| 2006/0136976 | A1 | 6/2006 | Coupe et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98, Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

Anonymous, Message Authentication with Partial Encryption, Research disclosure RD 296086, Dec. 10, 1988.

Liu, et al. Motion Vector Encryption in Multimedia Streaming, 2004, IEEE, pp. 64-71.

Alattar, A.M. et al., Improved selective encryption techniques for secure transmission of MPEG video bitstreams, Oct. 24, 1990, Digimarc Corp., Lake Oswego, OR, USA, IEEE, pp. 256-260.

Kunkelmann T. et al., A scalable security architecture for multimedia communication strandards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"A Report on Security Issues in Multimedia" by Gulwani, pp. 10-14, Apr. 30, 2000, Course Notes, Department of Computer Science and Engineering, Indian Institute of Technology Kanpur.

"Ad Agencies and Advertisers To Be Empowered with Targeted Ads Delivered by Televison's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmitters of MPEG-Compressed Bit-Streams" by Alattar and Al-Regib, pp. IV-340 to IV-343, 1999, IEEE.

"Fast Encryption Method for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia" '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

37 Visible World—A High Impact Approach to Customized Television Advertising" by Haberman, Dec. 2001.

ANONYMOUS, Message Authentication with Partial Encryption, Research discosure RD 296086, Dec. 10, 1998.

ANONYMOUS, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994), 29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www/cableworld.com/ct/archives/0202/0202digitalrights.htm.

Tom, et al., "Packet Video for Cell Loss Protecting Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

ANONYMOUS, New Digital Copy Protection Proposal Would Secure Authorized Copies, PR Newswire, Nov. 1998, pp. 1-3.

"How Networks Work—Milennium Edition" —pp. 88-89. Que Corporation, 2000.

* cited by examiner

PAT    PID=0x0000
Program 10, PMT PID=0100
Program 20, PMT PID=0200
Program 1010, PMT PID=1010
Program 1020, PMT PID=1020

— 138

PMT    PID=0x0100
Program 10
Video ES PID=0101
Audio 1 ES PID=0102
Audio 2 ES PID=0103

140

PMT    PID=0x0200
Program 20
Video ES PID=0201
Audio 1 ES PID=0202
Audio 2 ES PID=0203

— 142

SAMPLE TRANSPORT PSI

ENCRYPTION AND CONTENT CONTROL IN A DIGITAL BROADCAST SYSTEM

CROSS REFERENCE TO RELATED DOCUMENTS

This application is a continuation in part of patent applications entitled "Critical Packet Partial Encryption" to Unger et al., Ser. No. 10/038,217; patent applications entitled "Time Division Partial Encryption" to Candelore et al., Ser. No. 10/038,032, issued Nov. 21, 2006 as U.S. Pat. No. 7,139,398; entitled "Elementary Stream Partial Encryption" to Candelore, Ser. No. 10/037,914, issued Oct. 17, 2006 as U.S. Pat. No. 7,124,303; entitled "Partial Encryption and PID Mapping" to Unger et al., Ser. No. 10/037,499; and entitled "Decoding and Decrypting of Partially Encrypted Information" to Unger et al., Ser. No. 10/037,498. issued Oct. 24, 2006 as U.S. Pat. No. 7,127,619 all of which were filed on Jan. 2, 2002 and are hereby incorporated by reference herein.

This application is also related to and claims priority benefit of U.S. Provisional patent application Ser. No. 60/355,326 filed Feb. 8, 2002 entitled "Analysis of Content Selection Methods", to Candelore and to U.S. Provisional patent application Ser. No. 60/370,274 filed Apr. 5, 2002, entitled "Method of Control of Encryption and Content in a Digital Broadcast System" to Pedlow, Jr., et al. These applications are also hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, this invention relates to a method of control of content and encryption in a digital broadcast system.

BACKGROUND OF THE INVENTION

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

In order to provide appropriate tracking of clear packets and packets encrypted under multiple encryption systems, a system of multiple packet identifiers (PIDs) has been devised as described in the above-referenced patent applications. However, in head-end equipment provided by certain manufacturers, the PIDs can be remapped within the encryption encoder. This can result in the system losing track of the clear and encrypted packets.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 is an illustration of sample transport stream PSI consistent with certain embodiments of the present invention.

DETAILED DESCRIPTION OF THE INVENTION

Figure 1:
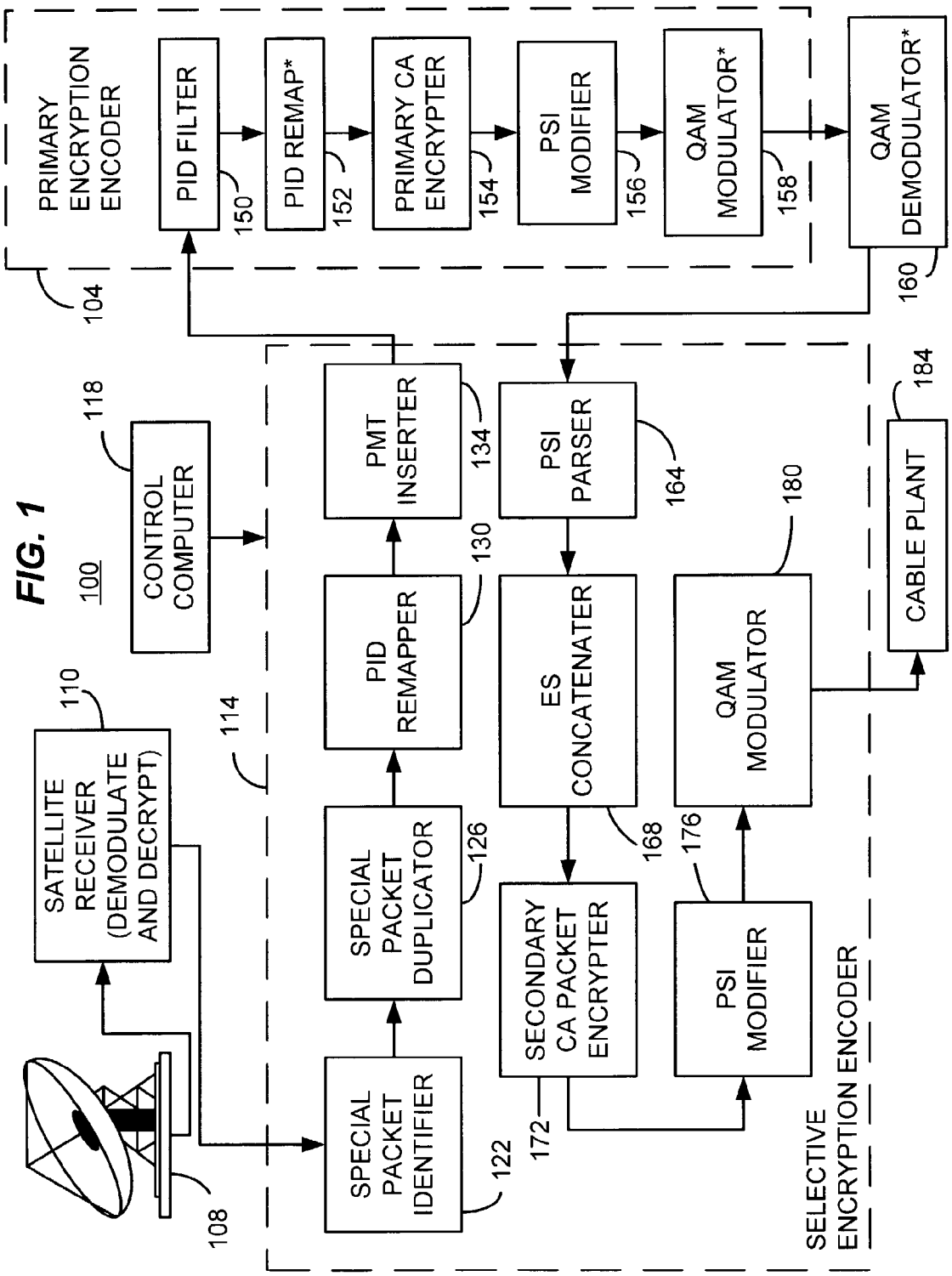
FIG. 1 is a block diagram of an exemplary cable system head end consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of AN content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Turning now to FIG. 1, a head end 100 of a cable television system suitable for use in practicing a dual encryption embodiment of the present invention is illustrated. Those skilled in the art will appreciate that the present invention could also be implemented using more than two encryptions systems without departing from the present invention. The illustrated head end 100 implements the dual partial encryption scenario of the present invention by adapting the operation of a conventional encryption encoder 104 (such as those provided by Motorola, Inc. and Scientific-Atlanta, Inc., and referred to herein as the primary encryption encoder) with additional equipment.

Head end 100 receives scrambled content from one or more suppliers, for example, using a satellite dish antenna 108 that feeds a satellite receiver 110. Satellite receiver 110 operates to demodulate and descramble the incoming content and supplies the content as a stream of clear (unencrypted) data to a selective encryption encoder 114. The selective encryption encoder 114, according to certain embodiments, uses two passes or two stages of operation, to encode the stream of data. Encoder 114 utilizes a secondary conditional access system (and thus a second encryption method) in conjunction with the primary encryption encoder 104 which operates using a primary conditional access system (and thus a primary encryption method). A user selection provided via a user interface on a control computer 118 configures the selective encryption encoder 114 to operate in conjunction with either a Motorola or Scientific Atlanta cable network (or other cable or satellite network).

It is assumed, for purposes of the present embodiment of the invention, tat the data from satellite receiver 110 is supplied as MPEG (Moving Pictures Expert Group) compliant packetized data. In the first stage of operation the data is passed through a Special Packet Identifier 122. Special Packet Identifier 122 identifies specific programming that is to be dual partially encrypted according to the present invention. The Special Packet Identifier 122 signals the Special Packet Duplicator 226 to duplicate special packets. The Packet Identifier (PID) Remapper 130, under control of the computer 118, to remap the PIDs of the elementary streams (ES) (i.e., audio, video, etc.) of the programming that shall remain clear and the duplicated packets to new PID values. The payload of the elementary stream packets are not altered in any way by Special Packet Identifier 122, Special Packet Duplicator 126, or PID remapper 130. This is done so that the primary encryption encoder 104 will not recognize the clear unencrypted content as content that is to be encrypted.

The packets may be selected by the special packet identifier 122 according to one of the selection criteria described in the above-referenced applications or may use another selection criteria such as those which will be described later herein. Once these packets are identified in the packet identifier 122, packet duplicator 126 creates two copies of the packet. The first copy is identified with the original PID so that the primary encryption encoder 104 will recognize that it is to be encrypted. The second copy is identified with a new and unused PID, called a "secondary PID" (or shadow PID) by the PID Remapper 130. This secondary PID will be used later by the selective encryption encoder 114 to determine which packets are to be encrypted according to the secondary encryption method. FIG. 2 illustrates an exemplary set of transport PSI tables 136 after this remapping with a PAT 138 defining two programs (10 and 20) with respective PID values 0100 and 0200. A first PMT 140 defines a PID=0101 for the video elementary stream and PIDs 0102 and 0103 for two audio streams for program 10. Similarly, a second PMT 142 defines a PID=0201 for the video elementary stream and PIDs 0202 and 0203 for two audio streams for program 20.

As previously noted, the two primary commercial providers of cable head end encryption and modulation equipment are (at this writing) Motorola, Inc. and Scientific-Atlanta, Inc. While similar in operation, there are significant differences that should be discussed before proceeding since the present selective encryption encoder 114 is desirably compatible with either system. In the case of Motorola equipment, the Integrated Receiver Transcoder (IRT), an unmodulated output is available and therefore there is no need to demodulate the output before returning a signal to the selective encryption encoder 114, whereas no such unmodulated output is available in a Scientific-Atlanta device. Also, in the case of current Scientific-Atlanta equipment, the QAM, the primary encryption encoder carries out a PID remapping function on received packets. Thus, provisions are made in the selective encryption encoder 114 to address this remapping.

In addition to the above processing, the Program Specific Information (PSI) is also modified to reflect this processing. The original, incoming Program Association Table (PAT) is appended with additional Program Map Table (PMT) entries at a PMT inserter 134. Each added PMT entry contains the new, additional streams (remapped & shadow PIDs) created as part of the selective encryption (SE) encoding process for a corresponding stream in a PMT of the incoming transport. These new PMT entries will mirror their corresponding original PMTs. The program numbers will be automatically assigned by the selective encryption encoder 114 based upon open, available program numbers as observed from the program number usage in the incoming stream. The selective encryption System 114 system displays the inserted program information (program numbers, etc) on the configuration user interface of control computer 118 so that the Multiple System Operator (MSO, e.g., the cable system operator) can add these extra programs into the System Information (SI) control system and instruct the system to carry these programs in the clear.

Figure 3:
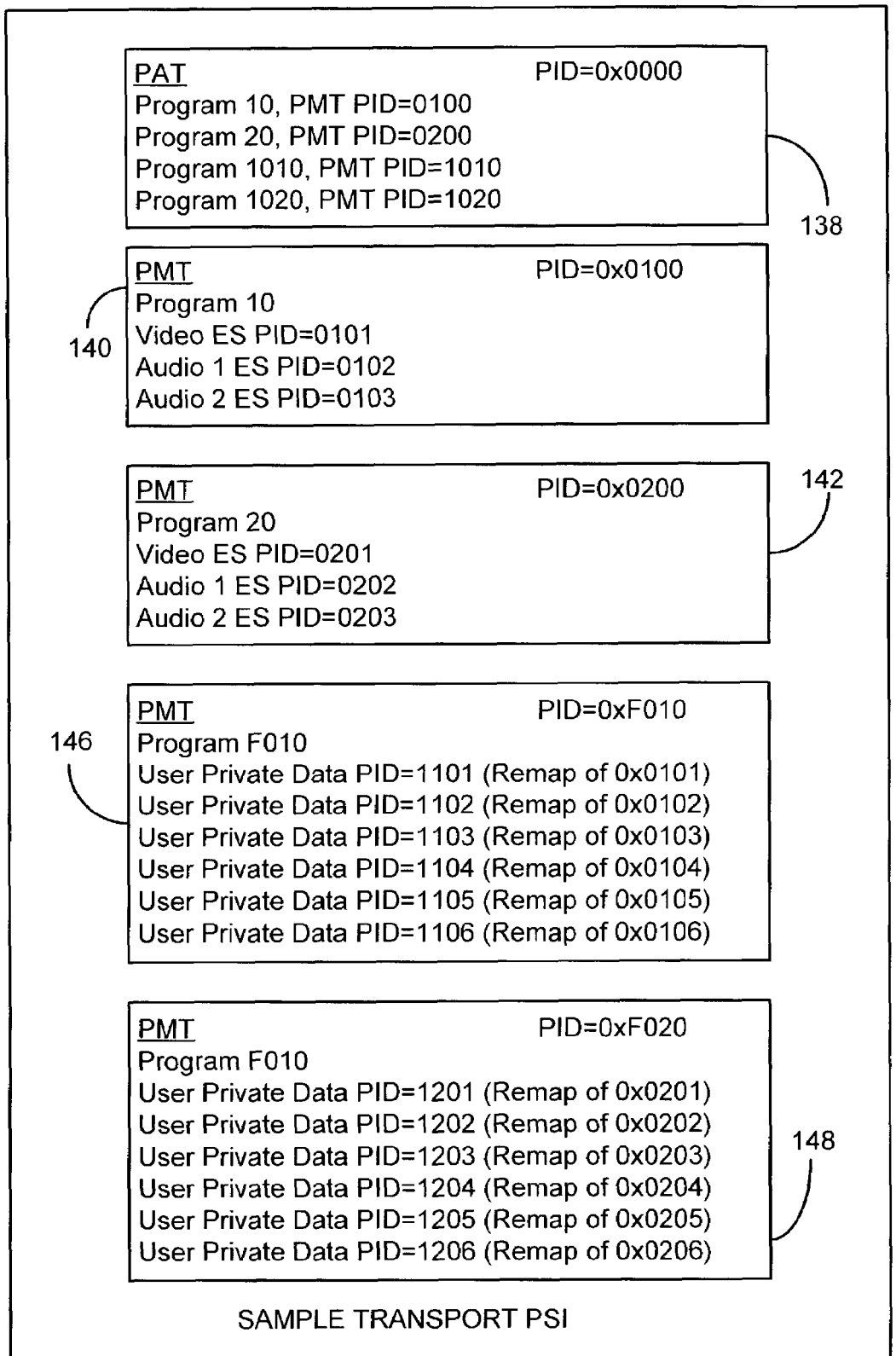
FIG. 3 is a further illustration of sample transport stream PSI consistent with certain embodiments of the present invention.

The modified transport PSI is illustrated as 144 in FIG. 3 with two additional temporary PMTs 146 and 148 appended to the tables of transport PSI 136. The appended PMTs 146 and 148 are temporary. They are used for the primary encryption process and are removed in the second pass of processing by the secondary encryption encoder. In accordance with the MPEG standard, all entries in the temporary PMTs are marked with stream type "user private" with an identifier of 0xF0. These PMTs describe the remapping of the PIDs for use in later recovery of the original mapping of the PIDs in the case of a PID remapping in the Scientific-Atlanta equipment. Of course, other identifiers could be used without departing from the present invention.

In order to assure that the Scientific-Atlanta PID remapping issue is addressed, if the selective encryption encoder 114 is configured to operate with a Scientific-Atlanta system, the encoder adds a user private data descriptor to each elementary stream found in the original PMTs in the incoming data transport stream (TS) per the format below (of course, other formats may also be suitable):

| Syntax | value | # of bits |
|---|---|---|
| private_data_indicator_descriptor() { | | |
|     descriptor_tag | 0xF0 | 8 |
|     descriptor_length | 0x04 | 8 |
|     private_data_indicator() { | | |
|         orig_pid | 0x???? | 16 |
|         stream_type | 0x?? | 8 |
|         reserved | 0xFF | 8 |
|     } | | |
| } | | |

The selective encryption encoder 114 of the current embodiment also adds a user private data descriptor to each elementary stream placed in the temporary PMTs created as described above per the format below:

| Syntax | value | # of bits |
|---|---|---|
| private_data_indicator_descriptor() { | | |
|     descriptor_tag | 0xF0 | 8 |
|     descriptor_length | 0x04 | 8 |
|     private_data_indicator() { | | |
|         orig_pid | 0x???? | 16 |
|         stream_type | 0x?? | 8 |
|         reserved | 0xFF | 8 |
|     } | | |
| } | | |

The "????" in the tables above is the value of the "orig_pid" which is a variable while the "??" is a "stream_type" value. The data field for "orig_pid" is a variable that contains the original incoming PID or in the case of remap or shadow PIDs, the original PID that this stream was associated with. The data field "stream_type" is a variable that describes the purpose of the stream based upon the chart below:

| Stream Type | Value |
|---|---|
| Legacy ES | 0x00 |
| Remapped ES | 0x01 |
| Shadow ES | 0x02 |
| Reserved | 0x03 - 0xFF |

These descriptors will be used later to re-associate the legacy elementary streams, which are encrypted by the Scientific-Atlanta, Inc. primary encryption encoder 104, with the corresponding shadow and remapped clear streams after PID remapping in the Scientific-Atlanta, Inc. modulator prior to the second phase of processing of the Selective Encryption Encoder 114. Those skilled in the art will appreciate that the above specific values should be considered exemplary and other specific values could be used without departing from the present invention.

In the case of a Motorola cable system being selected in the selective encryption encoder configuration GUI, the original PAT and PMTs can remain unmodified, providing the system does not remap PIDs within the primary encryption encoder. The asterisks in FIG. 1 indicate functional blocks that are not used in a Motorola cable system.

The data stream from selective encryption encoder 114 is passed along to the input of the primary encryption encoder 104 which first carries out a PID filtering process at 150 to identify packets that are to be encrypted. At 152, in the case of a Scientific-Atlanta device, a PID remapping may be carried out. The data are then passed along to an encrypter 154 that, based upon the PID of the packets, encrypts certain packets (in accord with the present invention, these packets are the special packets which are mapped by the packet duplicator 126 to the original PID of the incoming data stream for the current program). The remaining packets are unencrypted. The data then passes through a PSI modifier 156 that modifies the PSI data to reflect changes made at the PID remapper 130. The data stream is then modulated by a quadrature amplitude modulation (QAM) modulator 158 (in the case of the Scientific-Atlanta device) and passed to the output thereof. This modulated signal is then demodulated by a QAM demodulator 160. The output of the demodulator 160 is directed back to the selective encryption encoder 114 to a PSI parser 164.

The second phase of processing of the transport stream for selective encryption is to recover the stream after the legacy encryption process is carried out in the primary encryption encoder 104. The incoming Program Specific Information (PSI) is parsed at 164 to determine the PIDs of the individual elementary streams and their function for each program, based upon the descriptors attached in the first phase of processing. This allows for the possibility of PID remapping, as seen in Scientific-Atlanta primary encryption encoders. The elementary streams described in the original program PMTs are located at PSI parser 164 where these streams have been reduced to just the selected packets of interest and encrypted in the legacy CA system format in accord with the primary encryption method at encoder 104. The elementary streams in the temporary programs appended to the original PSI are also recovered at elementary stream concatenator 168. The packets in the legacy streams are appended to the remapped content, which is again remapped back to the PID of the legacy streams, completing the partial, selective encryption of the original elementary streams.

The temporary PMTs and the associated PAT entries are discarded and removed from the PSI. The user private data descriptors added in the first phase of processing are also removed from the remaining original program PMTs in the PSI. For a Motorola system, no PMT or PAT reprocessing is required and only the final secondary encryption of the transport stream occurs.

During the second phase of processing, the SE encoder 114 creates a shadow PSI structure that parallels the original MPEG PSI, for example, having at PAT origin at PID 0x0000. The shadow PAT will be located at a PID specified in the SE encoder configuration as indicated by the MSO from the user interface. The shadow PMT PIDs will be automatically assigned by the SE encoder 114 dynamically, based upon open, available PID locations as observed from PID usage of the incoming stream. The PMTs are duplicates of the original PMTs, but also have CA descriptors added to the entire PMT or to the elementary streams referenced within to indicate the standard CA parameters and optionally, shadow PID and the intended operation upon the associated elementary stream. The CA descriptor can appear in the descriptor1( ) or descriptor2( ) loops of the shadow PMT. If found in descriptor1( ), the CA_PID called out in the CA descriptor contains the non-legacy ECM PID which would apply to an entire program. Alternatively, the ECM PID may be sent in descriptor2( ). The CA descriptor should not reference the selective encryption elementary PID in the descriptor1( ) area.

| CA_PID Definition | Secondary_CA private data Value |
|---|---|
| ECM PID | 0x00 |
| Replacement PID | 0x01 |
| Insertion PID | 0x02 |
| ECM PID | undefined (default) |

This shadow PSI insertion occurs regardless of whetter the selective encryption operation is for a Motorola or Scientific Atlanta cable network. The elementary streams containing the duplicated packets of interest that were also assigned to the temporary PMTs are encrypted during this second phase of operation at secondary packet encrypter 172 in the secondary CA format based upon the configuration data of the CA system attached using the DVB (Digital Video Broadcasting) Simulcrypt™ standard.

The data stream including the clear data, primary encrypted data, secondary encrypted data and other information are then passed to a PSI modifier 176 that modifies the transport PSI information by deletion of the temporary PMT tables and incorporation of remapping as described above. The output of the PSI modifier 176 is modulated at a QAM modulator 180 and delivered to the cable plant 184 for distribution to the cable system's customers.

Figure 4:
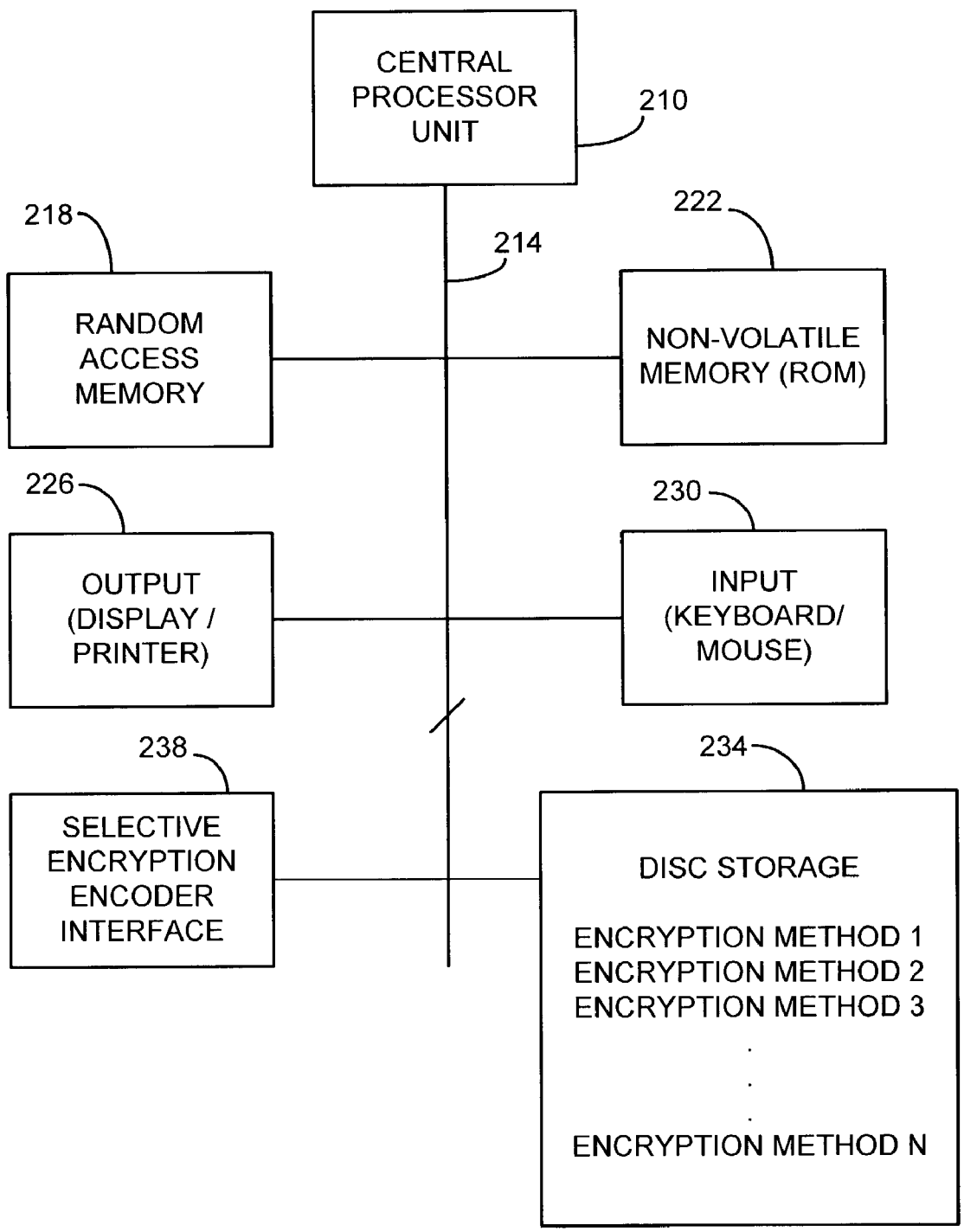
FIG. 4 is a block diagram of an illustrative control processor 100 consistent with certain embodiments of the present invention.

The control computer 118 may be a personal computer based device that is used to control the selective encryption encoder as described herein. An exemplary personal computer based control computer 100 is depicted in FIG. 4. Control computer 100 has a central processor unit (CPU) 210 with an associated bus 214 used to connect the central processor unit 210 to Random Access Memory 218 and Non-Volatile Memory 222 in a known maimer. An output mechanism at 226, such as a display and possibly printer, is provided in order to display and/or print output for the computer user as well as to provide a user interface such as a Graphical User Interface (GUI). Similarly, input devices such as keyboard and mouse 230 may be provided for the input of information by the user at the MSO. Control computer 100 also may have disc storage 234 for storing large amounts of information including, but not limited to, program files and data files. Control computer 100 also has an interface 238 for connection to the selective encryption encoder 114. Disc storage 234 can store any number of encryption methods that can be downloaded as desired by the MSO to vary the encryption on a regular basis to thwart hackers. Moreover, the encryption methods can be varied according to other criteria such as availability of bandwidth and required level of security.

Figure 5:
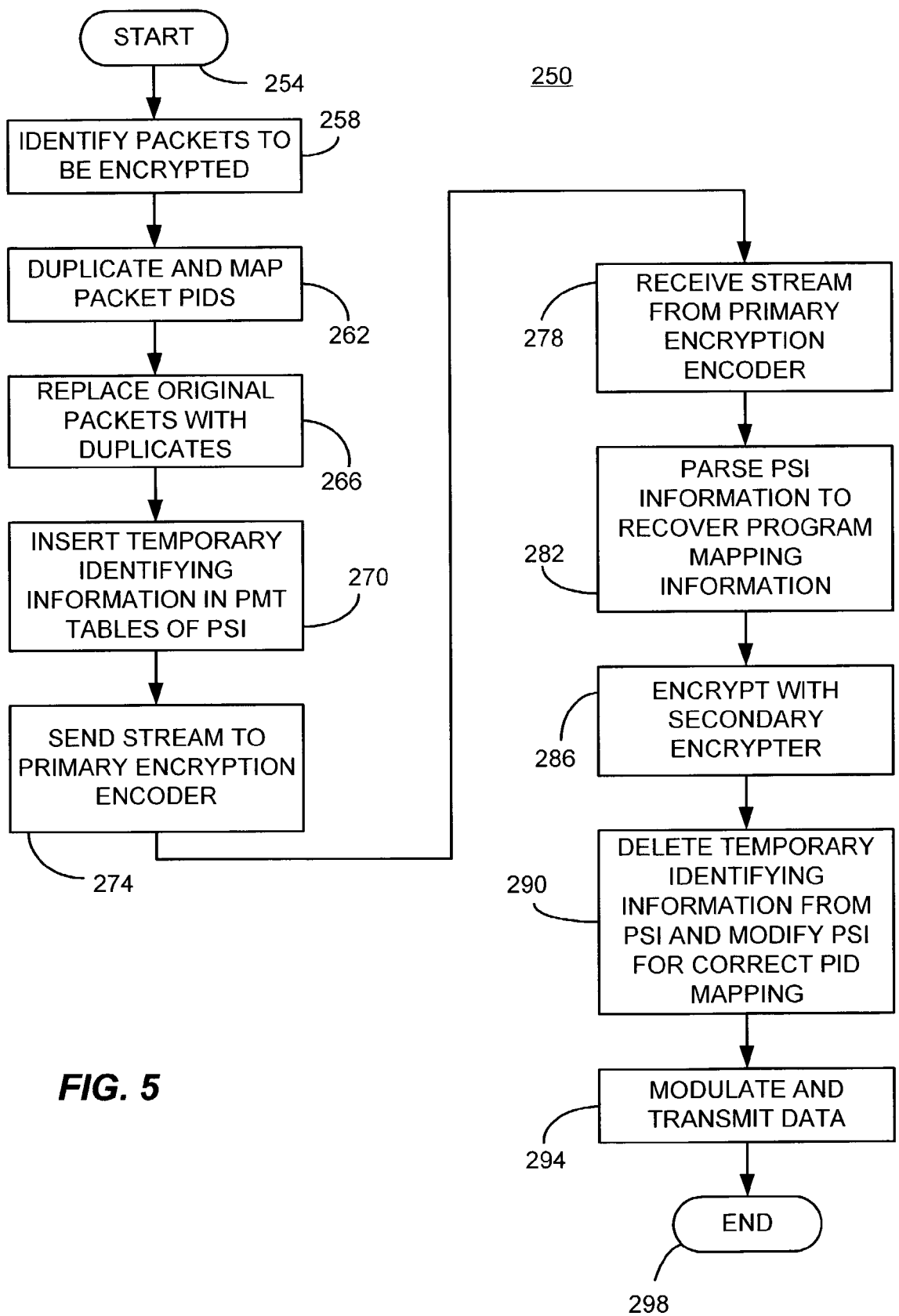
FIG. 5 is a flow chart generally describing the overall operation of the selective encryption encoder 114.

The operational process 250 of the selective encryption encoder 114 of FIG. 1 is described generally by the flow chart of FIG. 5 starting at 254. Incoming packets from the satellite receiver 110 are first optionally remapped at 122. In accordance with the specified dual encryption process, packets to be encrypted are identified at 258 and these packets are duplicated and mapped to specific PIDs at 262. The original unencrypted packets that are to be encrypted are replaced with these duplicated packets at 266. Temporary identifying information is inserted as PMT tables of the PSI, with the identifying information being coded as user private data at 270. This will permit reassociation of the proper packets with appropriate PIDs after processing (and possible PID remapping) by the primary encryption encoder. The data stream with the PSI, unencrypted and duplicated packets is then sent to the primary encryption encoder at 274 where it is processed by encryption of one set of the duplicated packets. As previously mentioned, for Scientific Atlanta encoders (or any other encoder operating in a similar manner), the PIDs may be remapped inside the encoder.

The data stream is then returned from the primary encryption encoder at 278. The data stream is then processed by parsing the PSI information to recover information describing any PID remapping that has taken place in the primary encryption encoder at 282. PID remapping can be addressed at this point in either of at least two ways. In one embodiment, the PIDs can be remapped back to the mapping as originally sent to the primary encryption encoder. This, of course, requires that each packet be examined and potentially remapped. A simpler technique is to simply accept any remapping that the primary encryption encoder has done.

The selective encryption processor encrypts the other of the pair of duplicated packets at 286. The PIDs can then either be remapped as described above or the PSI can simply be modified to correct for any PID remapping at 290. Also at 290, the temporary identifying information added to the PSI at 270 can be removed. The resultant data stream can then be modulated and transmitted to the end user at 294 and the process ends at 298.

The partial encryption process described above utilizes any suitable conditional access encrypting method at encrypters 154 and 172. Any suitable selective encryption process (e.g., such as those described in the above-referenced applications or any other suitable selective encryption technique). For example, in one such technique, only slice headers are encrypted at encrypters 154 and 172. Other encryption techniques are also possible. In general, but without the intent to be limiting, the selective encryption process utilizes intelligent selection of information to encrypt so that the entire program does not have to undergo dual encryption. By appropriate selection of appropriate data to encrypt, the program material can be effectively scrambled and hidden from those who desire to hack into the system and illegally recover commercial content without paying. Additionally, multiple combinations of the above techniques are possible to produce encryption that has varying bandwidth requirements, varying levels of security and varying complexity. Control computer 118 can be used to selectively choose an encryption technique from a plurality of available techniques. In accordance with certain embodiments of the present invention, a selection of packets to encrypt can be made by the control computer 118 in order to balance encryption security with bandwidth and in order to shift the encryption technique from time to time to thwart hackers.

Many modifications will occur to those skilled in the art which fall within the scope of the present invention. For example, in certain embodiments, it is not necessary to map the duplicated content to two new PID packets. In this embodiment, only one of the packets is remapped to get the legacy equipment to encrypt it. The other can stay "disguised" with the content that is to remain "clear". The PSI can be correspondingly simpler in such an embodiment.

Those skilled in the art will recognize that the present invention has been described in terms of exemplary embodiments based upon use of a programmed processor (e.g., processor 118, processors implementing any or all of the elements of 114). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A selective encryption method, comprising:
examining unencrypted packets of data in a digital video signal to identify a specified packet type;
duplicating the packets of the specified packet type to produce duplicate packets;
identifying the duplicate packets by a first packet identifier (PID);
identifying remaining unencrypted packets by a second packet identifier (PID);
replacing the packets of the specified packet type with the first duplicate packets;
generating identifying information that identifies the first duplicate packets, and the unencrypted packets;
storing the identifying information as transport program specific information (PSI);
creating a data stream comprising the PSI, the first duplicate packets, and the unencrypted packets into the data stream; and
sending the data stream to a primary encryption encoder.

2. The method according to claim 1, wherein the identifying information is stored as user private data in a program map table (PMT) in the transport PSI.

3. The method according to claim 1, further comprising:
receiving a data stream back from the primary encryption encoder;
reading a program map table (PMT), a program association table (PAT) and the identifying information from the transport PSI; and
mapping the PIDs associated with at least one of the first duplicate packets and the unencrypted packets to values stored in the identifying information.

4. The method according to claim 3, further comprising deleting the identifying information from the PSI.

5. The method according to claim 1, further comprising:
receiving a data stream back from the primary encryption encoder;
reading a program map table (PMT), a program association table (PAT) and the identifying information from the transport PSI; and
modifying the PSI to reflect any remapping of the PIDs in the primary encryption encoder.

6. The method according to claim 1, further comprising deleting the identifying information from the PSI.

7. A tangible computer readable storage medium storing instructions which, when executed on a programmed processor, carry out the selective encryption method according to claim 1.

8. The tangible computer readable storage medium of claim 7, wherein the storage medium comprises an electronic storage medium.

9. A selective encryption method, comprising:
examining unencrypted packets of data in a digital video signal to identify a specified packet type;
duplicating the packets of the specified packet type to produce first and second duplicate packets;
identifying the first duplicate packets by a first packet identifier (PID);
identifying the second duplicate packets by a second packet identifier (PID);
identifying unencrypted packets by a third packet identifier (PID);
replacing the packets of the specified packet type with the first duplicate packets and the second duplicate packets;
generating identifying information that identifies the first duplicate packets, the second duplicate packets and the unencrypted packets;
storing the identifying information as transport program specific information (PSI);
creating a data stream comprising the PSI, the first duplicate packets, the second duplicate packets and the unencrypted packets into the data stream; and
sending the data stream to a primary encryption encoder.

10. The method according to claim 9, wherein the identifying information is stored as user private data in a program map table (PMT) in the transport PSI.

11. The method according to claim 9, further comprising:
receiving a data stream back from the primary encryption encoder;
reading a program map table (PMT), a program association table (PAT) and the identifying information from the transport PSI; and
mapping the PIDs associated with at least one of the first duplicate packets, the second duplicate packets and the unencrypted packets to values stored in the identifying information.

12. The method according to claim 11, further comprising deleting the identifying information from the PSI.

13. The method according to claim 9, further comprising:
receiving a data stream back from the primary encryption encoder;
reading a program map table (PMT), a program association table (PAT) and the identifying information from the transport PSI; and
modifying the PSI to reflect any remapping of the PIDs in the primary encryption encoder.

14. The method according to claim 9, further comprising deleting the identifying information from the PSI.

15. A tangible computer readable storage medium storing instructions which, when executed on a programmed processor, carry out the selective encryption method according to claim 9.

16. The tangible computer readable medium of claim 15, wherein the storage medium comprises an electronic storage medium.

17. A selective encryption encoder, comprising:
a packet identifier that identifies packets of a specified packet type forming a pan of a program;
a packet duplicator, receiving an output from the packet identifier, that duplicates the identified packets to produce fast and second sets of the identified packets;
means far generating temporary identifying information that identifies the first and second sets of identified packets and for inserting the temporary identifying information as transport program specific information (PSI); and
means for sending and receiving packets to and from a primary encryption encoder to encrypt the fast set of identified packets under a first encryption method.

18. The selective encryption encoder of claim 17, wherein the temporary identifying information is stored as user private data in a program map table.

19. The selective encryption encoder of claim 17, further comprising:
a secondary encrypter for encrypting the second set of identified packets under a second encryption method; and
means for modifying the PSI to remove the temporary identifying information and to correctly associate the first and second sets of identified packets with the program.

20. The selective encryption encoder of claim 19, wherein the means for modifying the PSI further modifies the PSI to correctly associated unencrypted packets with the program.

21. The selective encryption encoder of claim 17, further comprising:
a secondary encrypter for encrypting the second set of identified packets under a second encryption method;
means for modifying the PSI to remove the temporary identifying information; and
a PID remapper that remaps the PIDs associated with the first and second identified packets to correctly associate the first and second sets of identified packets with the program.

22. The selective encryption encoder of claim 21, wherein the PID remapper further remaps PIDs associated with unencrypted packets to correctly associate the unencrypted packets with the program.

23. A selective encryption encoder, comprising:
means for receiving a demodulated clear data stream of unencrypted packets carrying a program;
a PID remapper that remaps packet identifiers PIDs associated with the program;
a packet identifier, receiving an output from the PID remapper, that identifies packets of a specified packet type forming a part of the program;
a packet duplicator, receiving an output of the packet identifier, that duplicates the identified packets to produce first and second sets of the identified packets;
means for generating temporary identifying information that identifies the first and second sets of identified packets and for inserting the temporary identifying information as user private data in a program map table (PMT) forming a part of transport program specific information (PSI);
means for sending and receiving packets comprising the PSI, the first and second sets of identified packets and the unencrypted packets to and from a primary encryption encoder to encrypt the first set of identified packets under a first encryption method;
a secondary encrypter for encrypting the second set of identified packets under a second encryption method;
means for modifying the PSI to remove the temporary identifying information and to correctly associate the first and second sets of identified packets and unencrypted packets with the program; and
a quadrature amplitude modulation (QAM) modulator that QAM modulates a data stream associated with the program and comprising PSI, first and second identified packets and the unencrypted packets.

24. A tangible computer readable storage medium that carries instructions that when executed on a programmed processor to facilitate operation of a selective encryption encoder wherein the instructions comprise:
a code segment that examines unencrypted packets of data in a digital video signal to identify a specified packet type;
a code segment that duplicates the packets of the specified packet type to produce first and second duplicate packets;
a code segment that identifies the first duplicate packets by a first packet identifier PID;
a code segment that identifies the second duplicate packets by a second packet identifier PID;
a code segment that identifies unencrypted packets by a third packet identifier (PID);
a code segment that replaces the packets of the specified packet type with the first duplicate packets and the second duplicate packets;
a code segment that generates identifying information that identifies the first duplicate packets, the second duplicate packets and the unencrypted packets;
a code segment that stores the identifying information as transport program specific information (PSI); and a code segment that creates a data stream comprising the PSI, the first duplicate packets, the second duplicate packets and the unencrypted packets into the data stream.

25. The tangible computer readable storage medium of claim 24, wherein the storage medium comprises an electronic storage medium.

26. A tangible computer readable storage medium carrying instructions that, when executed, carry out a selective encryption method, comprising:

examining unencrypted packets of data in a digital video signal to identify a specified packet type;

duplicating the packets of the specified packet type to produce first and second duplicate packets;

identifying the first duplicate packets by a first packet identifier (PID);

identifying the second duplicate packets by a second packet identifier (PID);

identifying unencrypted packets by a third packet identifier (PID);

replacing the packets of the specified packet type with the first duplicate packets and the second duplicate packets;

generating identifying information that identifies the first duplicate packets, the second duplicate packets and the unencrypted packets;

storing the identifying information as transport program specific information (PSI); and creating a data stream comprising the PSI, the first duplicate packets, the second duplicate packets and the unencrypted packets into the data stream.

27. The tangible computer readable storage medium of claim 26, wherein the storage medium comprises an electronic storage medium.

* * * * *

UNITED STATES PATENT AND TRADEMARK OFFICE
CERTIFICATE OF CORRECTION

PATENT NO. : 7,218,738 B2
APPLICATION NO. : 10/273875
DATED : May 15, 2007
INVENTOR(S) : Pedlow, Jr. et al.

Page 1 of 1

It is certified that error appears in the above-identified patent and that said Letters Patent is hereby corrected as shown below:

In col. 2, line 51, delete "AN" and insert --AV-- therefor.

In col. 3, line 34, delete "tat" and insert --that-- therefor.

In col. 7, line 34, delete "maimer" and insert --manner-- therefor.

In col. 11, line 35, delete "pan" and insert --part-- therefor.

In col. 11, line 38, delete "fast" and insert -- first -- therefor.

In col. 11, line 39, delete "far" and insert --for-- therefor.

In col. 11, line 45, delete "fast" and insert --first-- therefor.

Signed and Sealed this

Twenty-seventh Day of November, 2007

JON W. DUDAS
*Director of the United States Patent and Trademark Office*